June 2, 1953  C. OMAN ET AL  2,640,974
REMOTE METERING APPARATUS
Filed Sept. 29, 1949
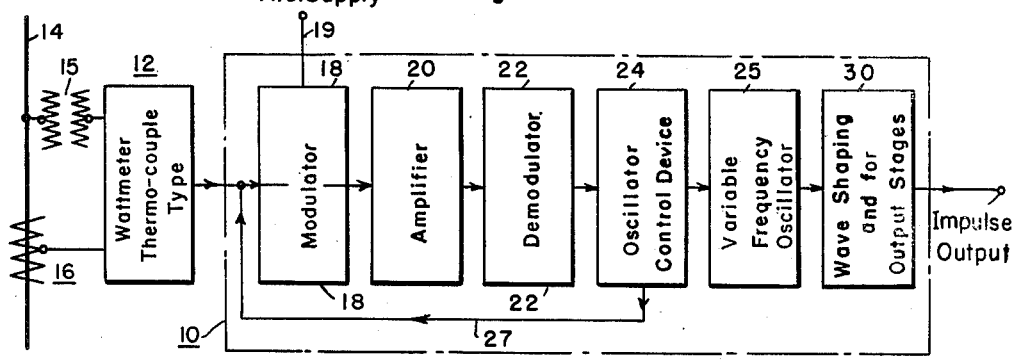
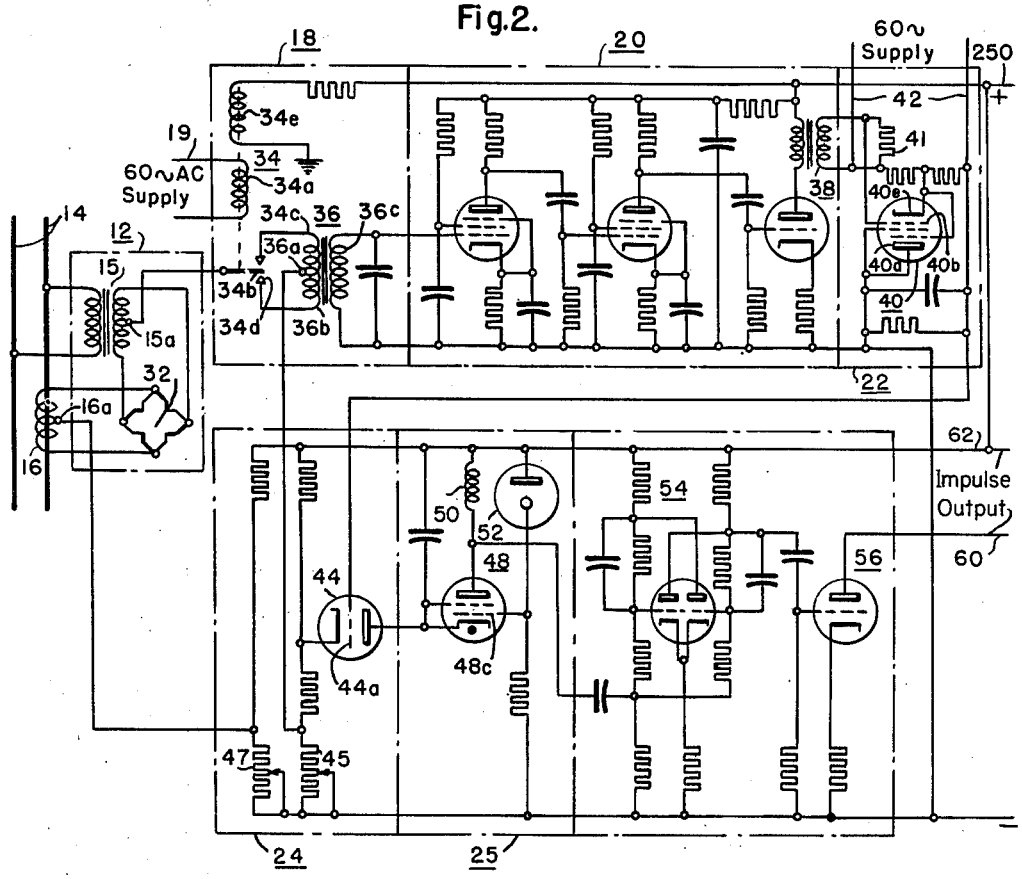
WITNESSES:
E. A. McCloskey
F. V. Giolma
INVENTORS
Carl Oman and
John R. Clark.
BY G. M. Crawford
ATTORNEY Patented June 2, 1953

2,640,974

UNITED STATES PATENT OFFICE 2,640,974

REMOTE METERING APPARATUS

Carl Oman, Cedar Grove, N. J., and John R. Clark, West Lafayette, Ind., assignors to Westinghouse Electric Corporation, East Pittsburgh, Pa., a corporation of Pennsylvania Application September 29, 1949, Serial No. 118,668

7 Claims. (Cl. 340—203)

Our invention relates, generally, to remote metering apparatus, and it has reference in particular to high-speed impulse telemetering transmitters.

Generally stated, it is an object of our invention to provide a telemetering impulse transmitter that is simple and inexpensive to manufacture, and efficient and reliable in operation.

More specifically, it is an object of our invention to provide, in a telemetering impulse transmitter, for utilizing a relaxation oscillator for producing telemetering impulses at a frequency which is proportional to a variable quantity to be metered or measured.

Another object of our invention is to provide, in a telemetering system, for controlling the frequency of a relaxation oscillator in accordance with the value of a direct-current metering voltage.

Yet another object of our invention is to provide, in a telemetering impulse transmitter, for producing an alternating-current voltage proportional to a direct-current metering voltage, amplifying and demodulating the alternating-current voltage and using the resultant voltage to control an impulse producing oscillator.

It is also an object of our invention to provide, in a telemetering impulse transmitter, for utilizing a vibrator relay for producing a 60 cycle voltage proportional to a direct-current metering voltage, amplifying and demodulating the alternating-current voltage, using the resultant to control an impulse producing oscillator, and utilizing a feed-back voltage proportional to the impulse rate of the oscillator to oppose the direct-current metering voltage.

It is an important object of our invention to provide, in a telemetering impulse transmitter, for utilizing a null balance type of impulse transmitter wherein a direct-current metering voltage is used to modulate an alternating-current wave before it is amplified, and wherein a feed-back voltage proportional to the frequency of an oscillator controlled by the demodulated output of the amplifier is utilized to balance out the direct-current metering voltage applied to the modulator.

Another important object of our invention is to provide, in a telemetering impulse transmitter, for utilizing the high gain characteristics of an alternating-current amplifier in an otherwise direct-current impulse producing circuit.

Other objects will in part be obvious, and will in part be explained hereinafter.

In practicing our invention in one of its forms, the direct-current output voltage of a thermocouple wattmeter is chopped, or used to modulate an alternating-current by means of a vibrator relay having an operating winding energized from a 60 cycle source. The chopped direct-current voltage is fed into a transformer so as to produce a modulated alternating-current having an amplitude proportional to the value of the direct-current voltage. The output from the transformer is amplified by an amplifier having a high gain at 60 cycles, and the output voltage of the amplifier is demodulated. The demodulated output is used to control the charging rate of a capacitor connected in the control circuit of a relaxation oscillator. A feed-back voltage proportional to the charging current of the capacitor is applied to the modulator in opposition to the direct-current output voltage of the thermo-couple wattmeter so as to provide a substantially null balance amplifier. The output from the relaxation oscillator is applied to a square wave generator, and then amplified so as to produce substantially square wave impulses which may be applied to a telemetering circuit.

For a more complete understanding of the nature and scope of our invention, reference may be made to the following detailed description which may be read in connection with the accompanying drawing, in which:

Fig. 1 is a block diagram of an impulse transmitter embodying the invention in one of its forms, and Fig. 2 is a diagrammatic view of the transmitter shown in the block diagram of Fig. 1.

Referring to Fig. 1 of the drawing, the reference numeral 10 may denote generally a telemetering impulse transmitter which may be utilized in connection with a metering device 12, which may be of the thermo-couple wattmeter type well known in the art, and connected to a power circuit, represented by the conductor 14, by means of a potential transformer 15 and a current transformer 16 for producing impulses suitable for telemetering purposes.

The transmitter 10 may comprise a modulator 18 disposed to be connected to an alternating-current source by means of a conductor 19 for chopping the output voltage of the wattmeter 12, that is, producing a 60 cycle voltage which is modulated by the direct-current output voltage of the wattmeter. An amplifier 20 which is disposed to have a relatively high gain at 60 cycles may be utilized to amplify the alternating-current output voltage of the modulator 18. This amplified voltage may then be rectified or demodulated by a demodulator 22, and the demodulated output voltage utilized to control an oscillator control device 24, for controlling the rate of oscillation of a variable frequency oscillator 25.

A feed-back voltage, which is proportional to the output of the transmitter, is balanced against the output of the wattmeter. For example, a feed-back voltage may be derived from the oscillator 25 or it may be derived from the oscillator control device 24, and applied through the conductor 27 to the input side of the modulator 18 in opposition to the output voltage of the wattmeter 12, so as to provide a null balance type of amplifying circuit. The output voltage of the oscillator 25 may be applied to a wave shaping and output stage 30 for producing impulses of substantially square wave form suitable for application to a telemetering circuit.

Referring to Fig. 2, it will be seen that the thermocouple type wattmeter 12 may be connected to the conductors 14 of the power circuit by means of the current transformer 16 and the voltage transformer 15, which may be provided with center taps 15a and 16a on the secondary windings. The thermo-couple type wattmeter may comprise a bridge circuit 32 of thermocouple devices, and may be disposed in a manner well known in the art with diametrically opposite points of the bridge circuit connected across the secondary windings of the transformers 15 and 16, the center taps 15a and 16a of the transformers comprising the output terminals.

The modulator 18 may comprise a vibrator type relay 34 having an operating winding 34a, which may be connected to a 60 cycle source of alternating-current by means of conductors 19. The operating winding 34a may be disposed to actuate an armature 34b to alternately engage stationary contact members 34c and 34d. A polarizing winding 34e may be provided on the relay for providing a slight delay in the separation of the armature 34b from the contact members 34c and 34d, in a manner well known in the art.

In order to provide a 60 cycle output voltage modulated by the direct-current output voltage of the wattmeter 12, the armature 34b may be connected to the center tap 15a of the potential transformer 15 and the contact members 34c and 34d may be connected to the opposite ends of the primary winding 36b of an output transformer 36 having a secondary winding 36c. The primary winding 36b may be provided with a center tap 36a which may be connected to the center tap 16a of the current transformer 16.

The alternating-current voltage produced in the secondary winding 36c by the vibration of the armature 34b may be amplified by the amplifier 20, which may be of a type well known in the art comprising, for example, three stages of capacitance-resistance coupled amplification. The output voltage of the amplifier 20 may be demodulated by connecting the secondary winding of an output transformer 38 in the plate circuit of the last stage of the amplifier to a rectifier device 40.

The output voltage from the transformer 38 may be applied to the grid 40b of the rectifier from a control resistor 41 having alternating-current energy applied between the cathode 40e and anode 40a from a 60 cycle source represented by conductors 42. Accordingly, the rectifier will conduct so long as the output voltage of the transformer 38 is in phase with the alternating current source. Should there be a reversal of energy in the conductors 14, the phase of the output voltage of the transformer will reverse and the rectifier device 40 will be rendered non-conductive, thus preventing instability of the transmitter because of cumulative feed-back.

The rectified or demodulated output from the rectifier device 40 may be applied to the control grid 44a of a valve device 44 comprising the oscillator control device 24, so as to vary the conductivity of the valve device 44 with the value of the demodulated output voltage of the demodulator 22. In order to provide a substantially null balance type of amplifier, a feed-back voltage may be applied to the modulator 18 being, for example, derived from the oscillator control device 24 although such voltage may as well be derived from the oscillator 25. This voltage may be derived from a cathode resistor 45 connected in the cathode circuit of the valve device 44.

With a view to providing a predetermined impulse base rate for a zero output voltage from the wattmeter 12, a bias voltage may be applied to the modulator 18 in series circuit relation with the feed-back voltage from the cathode resistor 45. This bias voltage may be provided in any suitable manner being, for example, obtained by connecting a bias resistor 47 in circuit relation with the cathode resistor 45 between the center tap 36a of the output transformer 36 and the current transformer 16, the bias resistor 47 being, for example, a portion of a voltage divider connected between the positive and negative terminals of the direct-current power supply for the transmitter.

The variable frequency oscillator 25 may be of the relaxation type comprising, for example, a valve device 48 of the gaseous type with a capacitor 50 connected in the anode-cathode circuit. The capacitor 50 may be connected to the direct-current source of power by the valve device 44 so that its charging rate will be responsive to the demodulated output voltage of the rectifier device 40. A substantially constant voltage may be maintained on the control grid 48c of the valve device 48 by means of a regulating valve device 52, so that the frequency of oscillation of the valve device 48 will be substantially proportional to the charging rate of the capacitor 50.

The output voltage of the valve device 48 of the oscillator 25 may be applied to trigger a square wave generator 54 of a well known Eccles-Jordon type, to produce impulses of substantially square wave form in response to oscillations of the valve device 48. The output voltage of the square wave generator 54 may be applied to a valve device 56 which comprises the output stage of the transmitter, so that conductors 60 and 62 may be connected to the pilot wire of a carrier transmitter or the like for producing telemetering impulses at a rate substantially proportional to the power in the power circuit represented by the conductors 14.

In operation, the direct-current voltage produced by the thermo-couple type wattmeter 12 is balanced directly against a feed-back voltage proportional to the output of the transmitter, and which may be obtained from the oscillator control device 24, so that any difference which may exist between these two direct-current voltages is greatly amplified by the amplifier 20 which may be designed to have a relatively high gain peak at 60 cycles, so as to cause further balancing of these voltages.

The charging rate of the capacitor 50 is controlled by the output voltage of the demodulator 40, so that the impulse rate of the oscillator 25 is substantially linear with respect to the direct-current output voltage of the wattmeter 12.

The impulse rate will be affected by the bias introduced by the bias resistor 47, so that a predetermined base rate of impulses may be provided for a zero value of direct-current output voltage of the wattmeter 12. The square wave generator 54 is utilized to provide a wave form suitable for telemetering since the output of the oscillator 25 comprises impulses of very short duration, which may not be entirely suitable for telemetering purposes. By using these impulses to trigger the square wave generator, a highly suitable wave form is provided for telemetering purposes.

From the above description and the accompanying drawing, it will be apparent that we have provided, in a simple and effective manner, for producing impulses for telemetering. By utilizing the features of our invention, a relatively wide range of par values may be covered, since the frequency of the oscillator may be varied over an exceedingly wide range with substantially no effect on the wave form of the impulses and substantially no variation from a linear relationship with the value of the direct-current metering voltage. By utilizing an alternating-current amplifier, a high degree of accuracy may be obtained since the amplification of the metering voltage may be made at a single frequency, namely in this instance, at 60 cycles. By using feed-back voltage proportional to the impulse frequency, errors in the amplification may be substantially neutralized, so that any changes in the characteristics of the valve devices therein will not appreciably affect the accuracy of the transmitter.

Since certain changes may be made in the above-described construction, and different embodiments of the invention may be made without departing from the spirit or scope thereof, it is intended that all the matter contained in the above-description and shown in the accompanying drawing shall be considered as illustrative and not in a limiting sense.

We claim as our invention:

1. A telemetering transmitter comprising, circuit means operable to produce a control voltage proportional to a reversible quantity to be metered, modulating means, circuit means connected to apply a bias voltage to the modulating means in series with the control voltage to produce an alternating current voltage having an amplitude which is a function of the control voltage, an oscillator, control means connecting the oscillator to be responsive to said alternating current voltage, and circuit means connected to apply a feed-back voltage from the control means to the modulating means which is dependent on the impulse rate of the oscillator.

2. In a telemetering system, metering means disposed to produce a continuously variable and reversible direct current voltage proportional to a quantity to be metered, a vibrator relay disposed to be energized from a source of alternating current and having contact means, a circuit connecting a bias voltage in circuit relation with said contact means and direct current voltage to produce an alternating current voltage having an amplitude modulated by the direct current voltage, amplifier means connected to amplify the modulated voltage, rectifier means connected to demodulate the amplified voltage, a capacitor, a control valve disposed to connect the capacitor to a source of electrical energy in accordance with the demodulated voltage to provide a charging circuit therefor, circuit means connected to apply a feed-back voltage in circuit relation with the contact means of the vibrator relay from the charging circuit of the capacitor, and an oscillator connected to produce an oscillatory discharge voltage having a frequency responsive to the charging rate of the capacitor.

3. The combination in a telemetering system, of a thermal converter operable to produce a direct current voltage proportional to a quantity to be metered, modulating means operable to produce a 60 cycle voltage wave having an amplitude modulated in accordance with the value of the direct current voltage, amplifying means having a high gain at 60 cycles connected to amplify the modulated 60 cycle wave, rectifier means disposed to demodulate the amplified wave, an oscillator disposed to produce impulses, circuit means for applying a 60 cycle bias voltage in circuit with the rectifier means, and control means connected to trigger the oscillator in accordance with the demodulated wave and supply a feed-back voltage to the modulator which is a function of the oscillator current.

4. In a telemetering transmitter, a vibrator relay having an alternating current operating winding and contact means operable thereby to produce an alternating current voltage proportional to a direct current control voltage, circuit means connected to apply a reversible direct current control voltage to the vibrator relay to modulate the alternating current voltage, amplifying means connected to amplify the modulated voltage, demodulating means connected to demodulate the amplified voltage, a capacitor, a charging circuit for the capacitor including a control valve connecting the capacitor to a source of electrical energy for charging at a rate dependent on the demodulated voltage, circuit means connected to apply in circuit relation with the contact means of the vibrator relay a feed-back voltage from the charging circuit dependent on the rate of charging in opposition to the direct current control voltage, additional circuit means connected to apply a bias voltage in circuit relation with the feed-back voltage to provide a base rate frequency, and a valve device connected to provide an oscillator having an impulse frequency proportional to the rate of charging the capacitor.

5. A telemetering impulse transmitter comprising, a control transformer having a secondary winding and a primary winding with a center tap, control means for energizing the primary winding including a thermal converter for providing a source of direct current potential responsive to a quantity to be metered and a relay having contact means connected in circuit relation with the primary winding and the source, said relay having an operating winding disposed to be connected to a source of alternating current to actuate the control means in synchronism with the frequency of said source, an amplifier connected to the secondary winding, rectifier means having a control electrode, circuit means connecting the rectifier means to an alternating current source of constant voltage, transformer means coupling the control electrode of the rectifier means to the amplifier, impulse means comprising a gaseous type discharge device and a capacitor, control means connected to charge the capacitor and render the discharge device conductive periodically in accordance with the output voltage of the rectifier, and circuit means connected with the control means to apply in circuit with the direct current potential a feed-back quantity which is a function of the capacitor current.

6. In a telemetering impulse transmitter, circuit means including a modulator operable to produce an alternating current voltage having an amplitude proportional to a quantity to be metered, a demodulator, amplifying means connecting said circuit means and the demodulator, circuit means connected to apply a 60 cycle bias voltage to the demodulator, an oscillator, circuit means connecting the oscillator to be responsive to the output of the demodulator, and additional circuit means connecting the oscillator and the modulator to apply to the modulator a feed-back quantity which is a function of the oscillator current.

7. In combination, an inverter connected to produce a 60 cycle alternating current voltage modulated in accordance with a direct current voltage, said inverter having a control winding disposed to be energized from a 60 cycle source, an electrode controlled rectifier connected to an alternating current source of bias voltage, and circuit means connected to apply a control voltage to the control electrode responsive to the voltage produced by the inverter to produce a direct current voltage responsive to the inverter output voltage, an oscillator having a capacitor connected to be charged at a rate dependent on the rectifier output voltage to produce impulses, and additional circuit means connected to apply a feed-back voltage in opposition to the output voltage of the circuit means in accordance with the charging current of the capacitor.

CARL OMAN.
JOHN R. CLARK.

References Cited in the file of this patent

UNITED STATES PATENTS

| Number | Name | Date |
|---|---|---|
| 2,227,596 | Luck | Jan. 7, 1941 |
| 2,297,543 | Eberhardt | Sept. 29, 1942 |
| 2,423,616 | Rath | July 8, 1947 |
| 2,480,575 | Hare | Aug. 30, 1949 |
| 2,507,590 | Clark | May 16, 1950 |

FOREIGN PATENTS

| Number | Country | Date |
|---|---|---|
| 381,719 | Great Britain | Oct. 13, 1932 |
| 529,919 | Great Britain | Dec. 2, 1940 |